Sept. 24, 1929.  J. A. SHIPP  1,729,191
PRESSURE MAINTAINING VALVE MECHANISM
Filed Nov. 27, 1925
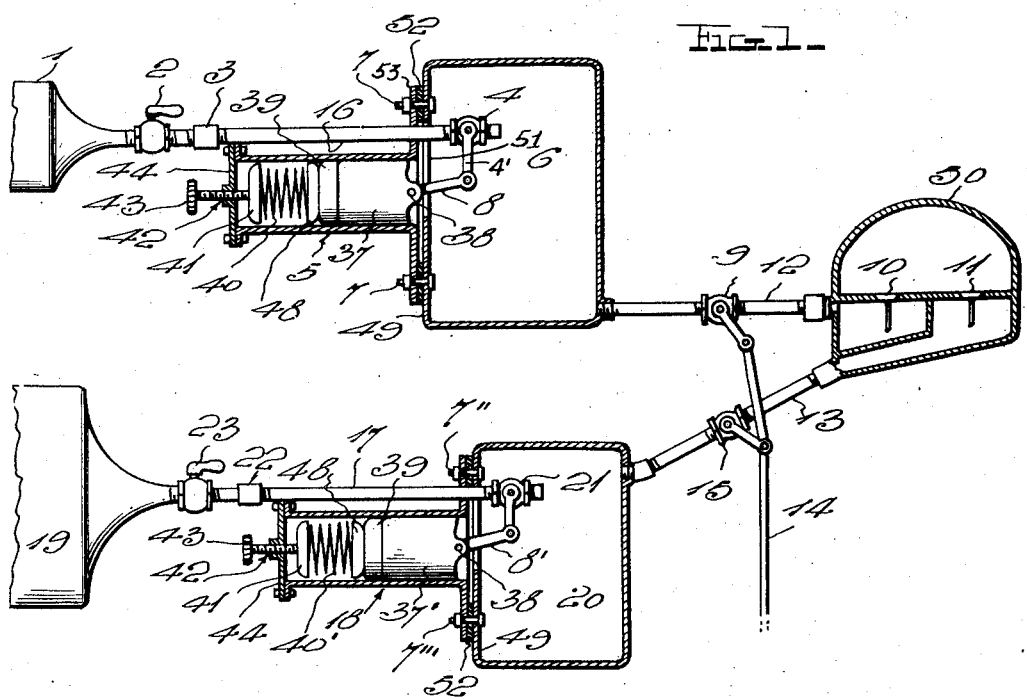
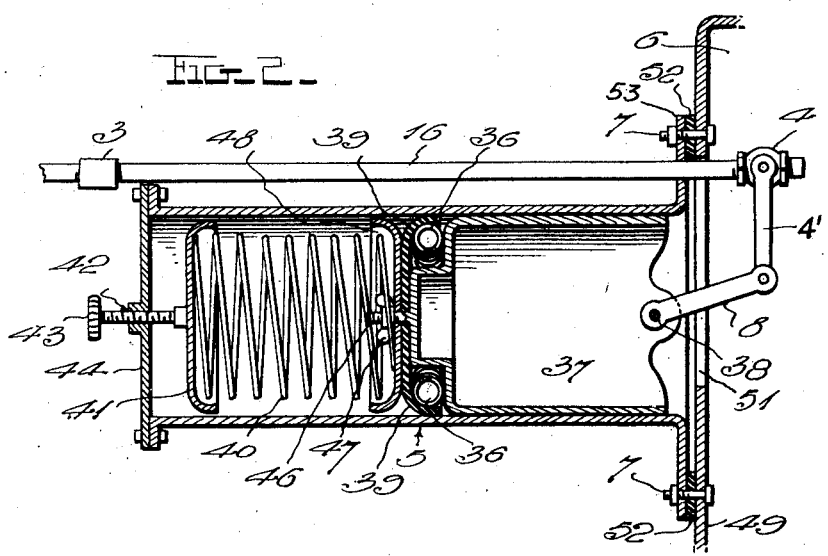
Witness
H. Woodard
Inventor
Jesse A. Shipp
By H. B. Willson & Co.
Attorneys Patented Sept. 24, 1929

1,729,191

UNITED STATES PATENT OFFICE

JESSE ALLEN SHIPP, OF CARLINVILLE, ILLINOIS

PRESSURE-MAINTAINING VALVE MECHANISM

Application filed November 27, 1925. Serial No. 71,865.

The invention relates to a valve mechanism for maintaining a predetermined gas pressure within a chamber, and two such valve mechanisms may be advantageously used for controlling hydrogen and oxygen flow to an internal combustion engine in which the gases are consumed to perform work. Such an application of the invention is shown in the accompanying drawing but represents only one of many uses for said invention.

The present valve mechanism is of a general type in which a pressure inlet for a gas chamber is provided with a valve, a piston is operatively connected with this valve, a cylinder contains the piston, a spring moves the piston in one direction to open the valve upon decrease of pressure in the chamber and restored pressure in said chamber moves the piston in the other direction to again close the valve.

It is the object of the invention to provide a new and improved construction and arrangement of parts which may be easily constructed, will be efficient, and will readily permit unitary movement of all working parts away from the pressure chamber whenever repairs are necessary.

With the foregoing in view, the invention resides in the novel subject matter hereinafter described and claimed, description being accomplished by reference to the accompanying drawing.

Fig. 1 is a sectional view partly in elevation, showing two of the pressure-maintaining valve mechanisms in connection with oxygen and hydrogen tanks and an internal combustion engine.

Fig. 2 is an enlarged sectional view through the greater portion of one of the pressure-maintaining valve mechanisms.

In the following description, attention will be centered upon the upper portion of Fig. 1 and upon Fig. 2 and reference will later be made to the lower portion of Fig. 1. The number 49 denotes a casing within which is a chamber 6, said chamber having an outlet pipe 12 provided preferably with a valve 9 for controlling the rate of discharge or for preventing such discharge, as may be required. Pipe 12 is shown connected with part of an internal combustion engine 50 having an oxygen intake valve 10 and a hydrogen intake valve 11.

One wall of the casing 49 is formed with an opening 51 and against the outer side of said wall is a gasket 52 which surrounds said opening 51. Secured to the casing 49 by bolts 7 and lying against the outer side of the gasket 52, is a continuous, flat flange 53 which projects outwardly from the open inner end of a cylinder 5, the outer end of this cylinder being closed by a head 44. The flange 53 closes the opening 51 against atmospheric air, but through said opening, the cylinder 5 communicates with the chamber 6.

Extending through the flange 53 is an oxygen inlet pipe 16, shown coupled at 3 to an oxygen tank 1 having a cut-off valve 2. Pipe 16 projects into the chamber 6 through the opening 51 and is provided with a rotary plug valve 4 within said chamber. The usual operating lever 4' of this valve is connected by a link 8 with a piston 37 in the cylinder 5, said piston being urged inwardly by a spring 40. Retainers 41 and 48 are shown for the ends of this spring, and an adjusting screw 43 is illustrated threaded through a boss 42 of the cylinder head 44 for so adjusting the retainer 41 as to vary the strength of the spring 40, as required. A stud 46 and nut 47 are shown securing the retainer 48 to the piston 37. A packing 39 expanded by a spring 36, or other adequate means, may be provided to prevent gas leakage around the piston 37.

Upon sufficient decrease of gas pressure in the chamber 6, the spring 40 moves the piston 37 inwardly and through the instrumentality of the link 8 and lever 4', said piston opens the valve 4, admitting more oxygen under pressure from the pipe 16. Restored gas pressure in chamber 6 moves piston 37 outwardly and hence effects closing of valve 4. Thus, substantially uniform gas pressure is maintained in the chamber 6.

Whenever repairs are necessary, the flange 53 may be unbolted from the casing 49 after closing valve 2 and disconnecting coupling 3. The flange 53, cylinder 5, pipe 16, valve 4, piston 37 and all other working parts of the valve mechanism may then be removed as a single unit from the casing 49, permitting access to any part or parts requiring attention.

The various reference numbers appearing at the lower portion of Fig. 1, denote an exact duplicate of the pressure-maintaining valve mechanism above described and specific description will not therefore be necessary. It may be explained however, that this duplicate valve mechanism controls the passage of hydrogen from a tank 19 to a pipe 13 which leads to the engine 50. Pipe 13 is provided with a valve 15 having the same function as valve 9, these two valves being preferably connected to common control means 14. 23 merely denotes a cut-off valve for tank 19.

I claim:—

In an apparatus for automatically maintaining a gas under a substantially uniform pressure, a casing whose interior constitutes a gas chamber, one side of said casing having an opening, a cylinder at the exterior of said casing, the inner end of said cylinder being provided with an outstanding annular flange secured to the casing and closing said opening thereof, a gas inlet carried by said flange and having a control valve disposed within said gas chamber, a piston slidable in said cylinder, means operatively connecting said piston with said valve to effect closing of the latter upon outward movement of the piston, and a spring for inwardly moving said piston to open the valve upon decrease of pressure in said chamber.

JESSE ALLEN SHIPP.